US012211661B2

(12) United States Patent
Simonelli et al.

(10) Patent No.: US 12,211,661 B2
(45) Date of Patent: Jan. 28, 2025

(54) STATUS INDICATOR FOR SWITCHGEAR

(71) Applicant: G & W ELECTRIC COMPANY, Bolingbrook, IL (US)

(72) Inventors: James K. Simonelli, Orlando, FL (US); Sean G. Murphy, Villa Park, IL (US); Arturas Dauksas, Oak Lawn, IL (US); Blair S. Kerr, Downers Grove, IL (US)

(73) Assignee: G & W ELECTRIC COMPANY, Bolingbrook, IL (US)

( * ) Notice: Subject to any disclaimer, the term of this patent is extended or adjusted under 35 U.S.C. 154(b) by 0 days.

(21) Appl. No.: 18/380,074

(22) Filed: Oct. 13, 2023

(65) Prior Publication Data

US 2024/0038473 A1 Feb. 1, 2024

Related U.S. Application Data

(62) Division of application No. 17/749,263, filed on May 20, 2022, now Pat. No. 11,791,120.

(Continued)

(51) Int. Cl.
*H01H 71/04* (2006.01)

(52) U.S. Cl.
CPC ....... *H01H 71/04* (2013.01); *H01H 2071/042* (2013.01); *H01H 2071/046* (2013.01)

(58) Field of Classification Search
CPC ............. H01H 71/04; H01H 2071/042; H01H 2071/046; H01H 3/60; H01H 9/16; H01H 33/6662
See application file for complete search history.

(56) References Cited

U.S. PATENT DOCUMENTS

| | | |
|---|---|---|
| 2,866,965 A | 12/1958 | Houdek, Jr. et al. |
| 3,225,170 A | 12/1965 | Chabala et al. |

(Continued)

FOREIGN PATENT DOCUMENTS

| | | |
|---|---|---|
| AU | 2012205159 B2 | 6/2014 |
| CA | 2532483 C | 7/2012 |

(Continued)

OTHER PUBLICATIONS

G&W Electric Co. Trident Solid Dielectric Switchgear. Catalog SG1-TS03. 2004 Edition. pp. 6, 7, 10 & 12. (5 pages).

*Primary Examiner* — Shawki S Ismail
*Assistant Examiner* — Lisa N Homza
(74) *Attorney, Agent, or Firm* — Michael Best & Friedrich LLP

(57) ABSTRACT

A switchgear assembly includes an indicator assembly to indicate whether a movable contact is in an open or a closed position. The indicator assembly includes an indicator body having first and second sections. The indicator body is rotatable to display the first section in the open position and the second section in the closed position. The indicator assembly also includes a drive gear having a first helical spline and coupled to an actuator of the switchgear assembly such that operation of the actuator moves the drive gear, and an elongated driven gear having a second helical spline extending along a length of the driven gear and engaged with the first helical spline of the drive gear such that movement of the drive gear rotates the driven gear. The driven gear is coupled to the indicator body such that rotation of the driven gear causes rotation of the indicator body.

20 Claims, 13 Drawing Sheets

Related U.S. Application Data

(60) Provisional application No. 63/191,599, filed on May 21, 2021.

(56) References Cited

U.S. PATENT DOCUMENTS

| | | | |
|---|---|---|---|
| 3,247,824 | A | 4/1966 | Arthur |
| 3,564,465 | A | 2/1971 | Harvey |
| 3,721,789 | A | 3/1973 | Black |
| 3,852,556 | A | 12/1974 | Kane et al. |
| 3,956,721 | A | 5/1976 | Link |
| 4,016,384 | A | 4/1977 | Lerow, Jr. et al. |
| 4,105,878 | A | 8/1978 | Date et al. |
| 4,150,270 | A | 4/1979 | Zunick |
| 4,568,804 | A | 2/1986 | Luehring |
| 4,910,367 | A | 3/1990 | Akers et al. |
| 5,062,022 | A | 10/1991 | Beard et al. |
| 5,223,822 | A | 6/1993 | Stommes et al. |
| 5,278,530 | A | 1/1994 | Zovath |
| 5,469,805 | A | 11/1995 | Gibbs |
| 5,497,096 | A | 3/1996 | Banting |
| 5,521,567 | A | 5/1996 | Devonald, III et al. |
| 5,535,698 | A | 7/1996 | Trevisan |
| 5,593,022 | A | 1/1997 | Schaeffer et al. |
| 5,605,225 | A | 2/1997 | Schaeffer |
| 5,623,891 | A | 4/1997 | Miller |
| 5,663,712 | A | 9/1997 | Kamp |
| 5,864,107 | A | 1/1999 | French et al. |
| 5,912,604 | A | 6/1999 | Harvey et al. |
| 5,986,211 | A | 11/1999 | Greer et al. |
| 6,040,538 | A | 3/2000 | French et al. |
| 6,114,642 | A | 9/2000 | French et al. |
| 6,198,062 | B1 | 3/2001 | Mather et al. |
| 6,268,577 | B1 | 7/2001 | Marquardt et al. |
| 6,559,394 | B2 | 5/2003 | Yang |
| 7,278,889 | B2 | 10/2007 | Muench et al. |
| 7,314,021 | B2 | 1/2008 | Moninski |
| 7,579,571 | B2 | 8/2009 | Siebens et al. |
| 7,692,880 | B2 | 4/2010 | Jänicke |
| 7,819,133 | B2 | 10/2010 | Minervini et al. |
| 8,141,583 | B2 | 3/2012 | Minervini et al. |
| 8,141,586 | B2 | 3/2012 | Stepanov et al. |
| 8,462,668 | B2 | 6/2013 | Kuo et al. |
| 8,492,668 | B2 | 7/2013 | Broly |
| 8,819,133 | B2 | 8/2014 | Wang |
| 8,881,670 | B2 | 11/2014 | Binkley |
| 8,973,519 | B2 | 3/2015 | Bindics et al. |
| 9,148,000 | B2 | 9/2015 | Raorane et al. |
| 9,216,527 | B2 | 12/2015 | Martin et al. |
| 9,343,881 | B2 | 5/2016 | Hyrenbach et al. |
| 9,496,100 | B2 | 11/2016 | Matsunaga et al. |
| 9,576,757 | B2 | 2/2017 | Opfer |
| 9,659,728 | B2 | 5/2017 | Martin et al. |
| 9,685,280 | B2 | 6/2017 | Benson et al. |
| 9,754,738 | B2 | 9/2017 | Faulkner et al. |
| 9,852,866 | B2 | 12/2017 | Sangawa et al. |
| 9,953,772 | B2 | 4/2018 | Korves et al. |
| 10,181,384 | B2 | 1/2019 | Faulkner et al. |
| 10,290,437 | B1 | 5/2019 | Schafer |
| 10,714,275 | B2 | 7/2020 | Geist et al. |
| 2009/0078681 | A1* | 3/2009 | Marchand .......... H01H 33/6606 218/140 |
| 2013/0187732 | A1* | 7/2013 | Bullock ............. H01H 33/6662 335/6 |
| 2015/0262768 | A1 | 9/2015 | Siebens et al. |
| 2022/0044894 | A1* | 2/2022 | Nault ....................... H02B 1/36 |
| 2022/0208491 | A1 | 6/2022 | Dauksas et al. |
| 2022/0216022 | A1* | 7/2022 | Shamseldin ..... H01H 33/66207 |
| 2022/0238288 | A1* | 7/2022 | Dauksas .......... H01H 33/66207 |
| 2022/0375708 | A1* | 11/2022 | Simonelli .............. H01H 71/04 |

FOREIGN PATENT DOCUMENTS

| | | | |
|---|---|---|---|
| CA | 2783283 | C | 5/2016 |
| DE | 3000212 | A1 | 8/1980 |
| EP | 0677905 | B1 | 8/1999 |
| EP | 1017142 | A1 | 7/2000 |
| EP | 0948006 | B1 | 7/2005 |
| EP | 1863053 | B1 | 11/2010 |
| EP | 2272074 | B1 | 7/2015 |
| GB | 493618 | B | 1/2016 |
| MX | 9706570 | A | 7/1998 |
| MX | PA00001676 | A | 8/2003 |
| MX | 2007015920 | A | 3/2008 |
| MX | 2007006507 | A | 12/2008 |
| MX | 2012009110 | A | 2/2013 |
| MX | 352214 | B | 11/2017 |
| MX | 2018012191 | A | 2/2019 |
| WO | 2011020512 | A1 | 2/2011 |
| WO | 2016187644 | A1 | 12/2016 |
| WO | 2019201476 | A1 | 10/2019 |

* cited by examiner

STATUS INDICATOR FOR SWITCHGEAR

CROSS-REFERENCE TO RELATED APPLICATIONS

The present application is a divisional application of U.S. patent application Ser. No. 17/749,263 filed May 20, 2022, which claims priority to U.S. Provisional Patent Application No. 63/191,599, filed May 21, 2021, the entire contents of all of which are incorporated herein by reference.

FIELD OF THE DISCLOSURE

The present disclosure relates to electrical switchgear, and more particularly to visual indicators for indicating an operational state of electrical switchgear.

BACKGROUND OF THE DISCLOSURE

Reclosers are a type of electrical switchgear that provide line protection on overhead electrical power lines and serve to segment power circuits into smaller sections, thereby reducing the number of potentially impacted customers in the event of a fault. Reclosers are often mounted on poles or other overhead frames. Some reclosers provide visual status indicators for indicating whether the recloser is in an open or closed state. Such indicators may be mechanically driven by an actuating mechanism (e.g., an electromagnetic and/or spring-biased actuating mechanism) of the recloser, which also serves to open and close the contacts of the recloser.

SUMMARY OF THE DISCLOSURE

A need exists for fault protection and circuit segmentation in power transmission circuits, which typically operate at higher voltages (e.g., up to 1,100 kV). Reclosers allow for multiple automated attempts to clear temporary faults on overhead lines. In power transmission systems, this function is typically achieved using circuit breakers in substations. The present disclosure provides in one exemplary embodiment a modular recloser that can operate at voltages up to 72.5 kV and that can be pole-mounted outside of a substation. By enabling the placement of reclosers outside the substation, the present disclosure advantageously enables over-current protection to be positioned closer to potential faults and thereby segment the portion of the power transmission circuit affected by the fault to a smaller section. This reduces the potential impact of a fault to a smaller number of customers or end users, improving the power transmission system's reliability.

As reclosers increase in size and voltage rating, however, the actuating mechanism for opening and closing the contacts must be made more powerful in order to move the contacts with sufficient speed and force to minimize electrical arcing between the contacts. Accordingly, a need exists for an indicator able to withstand the large actuation forces produced in a high voltage recloser, to reliably indicate the operational status of the recloser.

The present disclosure provides, in one aspect, a switchgear assembly including a housing and a vacuum interrupter assembly supported within the housing, the vacuum interrupter assembly including a first contact and a second contact moveable relative the first contact along a longitudinal axis between a closed position in which the first contact engages the second contact and an open position in which the first contact is spaced from the second contact. The switchgear assembly also includes an actuator supported within the housing and operable to move the second contact between the open position and the closed position, a cover coupled to the housing, and an indicator assembly configured to indicate whether the second contact is in the open position or the closed position. The indicator assembly includes an indicator body having first and second sections. The indicator body is rotatable relative to the longitudinal axis to display the first section through the cover when the second contact is in the open position, and to display the second section through the cover when the second contact is in the closed position. The indicator assembly also includes a drive gear having a first helical spline and coupled to the actuator such that operation of the actuator moves the drive gear along the longitudinal axis, and an elongated driven gear having a second helical spline extending along a length of the driven gear and engaged with the first helical spline of the drive gear such that movement of the drive gear along the longitudinal axis rotates the driven gear about the longitudinal axis. The driven gear is coupled to the indicator body such that rotation of the driven gear causes rotation of the indicator body.

The present disclosure provides, in another aspect, an indicator operable to display whether a switchgear assembly is in an open position or a closed position. The indicator includes an indicator body rotatable relative to a longitudinal axis of the switchgear assembly, and upon rotation, the indicator is configured to selectively display indicia that indicates whether the switchgear is in the open position or the closed position. The indicator also includes a drive gear coupled to a movable contact of the switchgear assembly such that operation of the switchgear assembly between the open position and the closed position moves the drive gear along the longitudinal axis, and a driven gear engaged with the drive gear such that movement of the drive gear along the longitudinal axis rotates the driven gear about the longitudinal axis. The driven gear extends through the drive gear in a direction along the longitudinal axis and is coupled to the indicator body such that rotation of the driven gear causes rotation of the indicator body. The indicator also includes a cover coupled to the switchgear assembly and through which at least a portion of the indicator body is visible, and the indicator body is spaced apart from the cover.

The present disclosure provides, in another aspect, a switchgear assembly including a housing, a vacuum interrupter assembly supported within the housing, the vacuum interrupter assembly including a first contact and a second contact moveable relative the first contact along a longitudinal axis between a closed position in which the first contact engages the second contact and an open position in which the first contact is spaced from the second contact, an actuator supported within the housing and operable to move the second contact between the open position and the closed position, a cover coupled to the housing, and an indicator assembly configured to indicate whether the second contact is in the open position or the closed position. The indicator assembly includes an indicator body rotatable relative to a longitudinal axis of the switchgear assembly, wherein upon rotation the indicator is configured to selectively display indicia that indicates whether the switchgear is in the open position or the closed position, a drive gear movable in response to movement of the contact between the open position and the closed position, and an elongated driven gear engaged with the drive gear such that movement of the drive gear along a length of the elongated driven gear rotates the driven gear. The elongated driven gear extends through the drive gear and is coupled to the indicator body such that rotation of the driven gear causes rotation of the indicator body. At least a portion of the indicator body is visible through the cover, and the indicator body is spaced apart from the cover.

Other aspects of the invention will become apparent by consideration of the detailed description and accompanying drawings.

Before any embodiments are explained in detail, it is to be understood that the arrangements are not limited in application to the details of embodiment and arrangement of components set forth in the following description or illustrated in the following drawings. The invention is capable of other embodiments and of being practiced or of being carried out in various ways.

DETAILED DESCRIPTION

Figure 1:
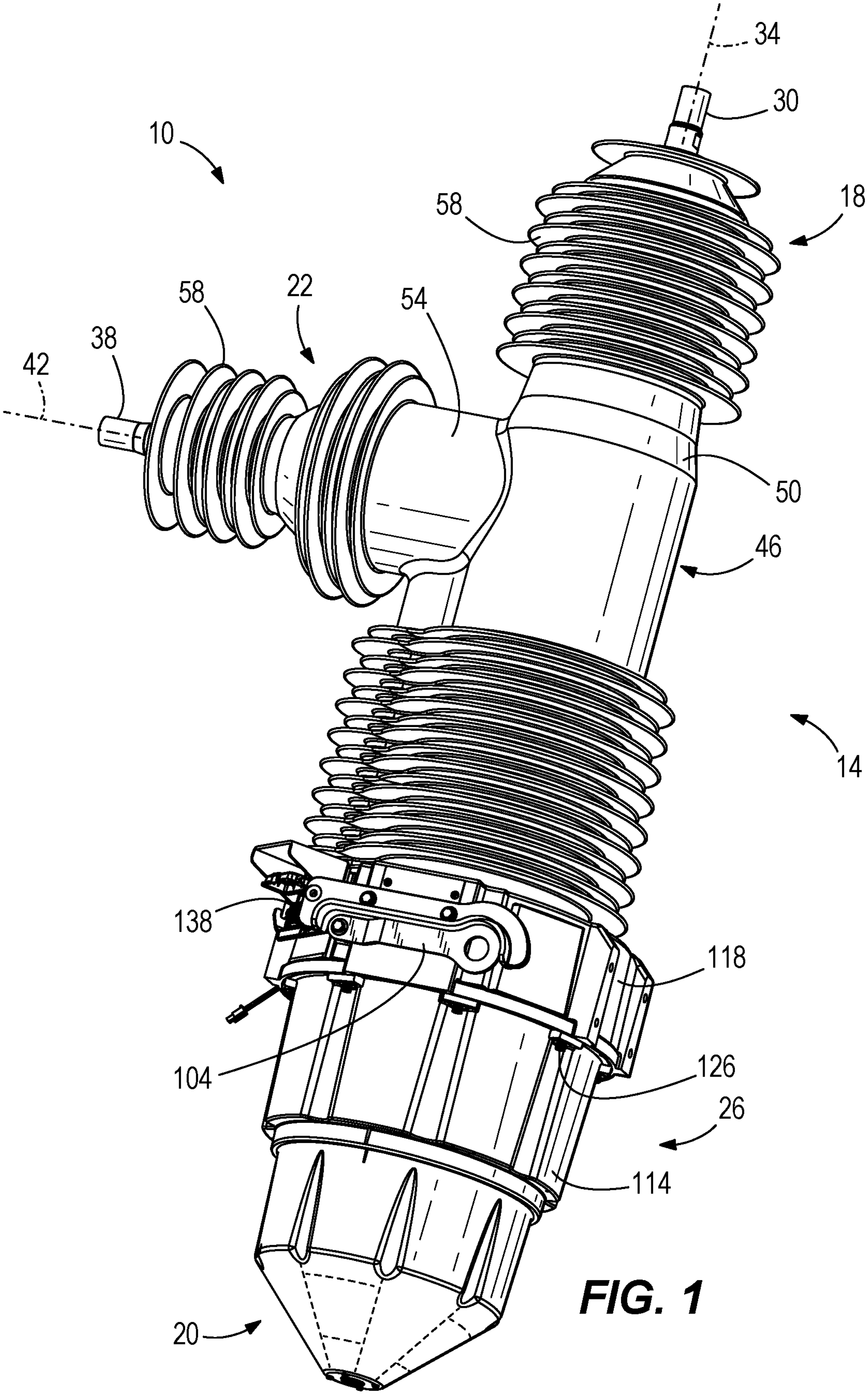
FIG. 1 is a perspective view of a recloser including an indicator assembly, according to an embodiment of the present disclosure.

FIG. 1 illustrates a recloser 10 according to an embodiment of the present disclosure. The recloser 10 includes a housing assembly 14, a vacuum interrupter ("VI") assembly 18, a status indicator assembly 20, a source conductor assembly 22, and an actuator assembly 26. The VI assembly 18 includes a first terminal 30 extending from the housing assembly 14 along a first longitudinal axis 34, and the source conductor assembly 22 includes a second terminal 38 extending from the housing assembly 14 along a second longitudinal axis 42 perpendicular to the first longitudinal axis 34. In other embodiments, the second longitudinal axis 42 may be obliquely oriented relative to the first longitudinal axis 34. As described in greater detail below, the actuator assembly 26 operates the VI assembly 18 to selectively break and/or reestablish a conductive pathway between the first and second terminals 30, 38.

The illustrated housing assembly 14 includes a main housing 46 constructed from an insulating material, such as epoxy, that forms a solid dielectric module. For example, the main housing 46 can be constructed from a silicone or cycloaliphatic epoxy or a fiberglass molding compound. In the illustrated embodiment, the main housing 46 is covered with a silicone rubber layer that withstands heavily polluted environments and serves as a dielectric material for the recloser 10. The silicone rubber layer may be overmolded onto the main housing 46. In the illustrated embodiment, the main housing 46 includes a first bushing 50 that surrounds and at least partially encapsulates the VI assembly 18, and a second bushing 54 that surrounds and at least partially encapsulates the source conductor assembly 22. The silicone rubber layer includes a plurality of sheds 58 extending radially outward from both bushings 50, 54. The first and second bushings 50, 54 are integrally formed together with the main housing 46 as a single monolithic structure in the illustrated embodiment. Alternatively, the first and second bushings 50, 54 may be formed separately and coupled to the main housing 46 in a variety of ways (e.g., via a threaded connection, snap-fit, etc.).

Figure 2:
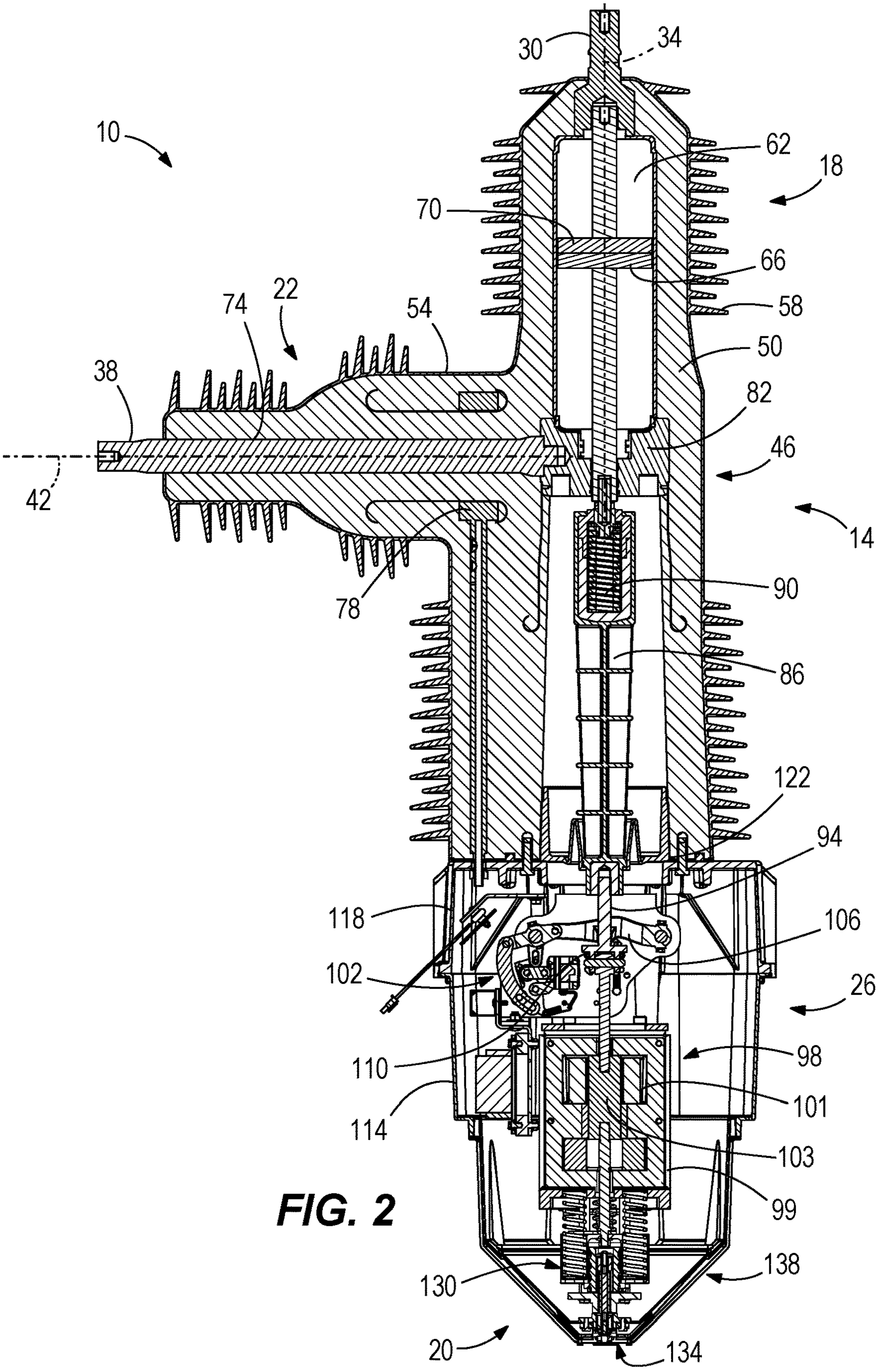
FIG. 2 is a cross-sectional view of the switchgear assembly of FIG. 1.

With reference to FIG. 2, the VI assembly 18 includes a vacuum bottle 62 at least partially molded within the first bushing 50 of the main housing 46. The vacuum bottle 62 encloses a movable contact 66 and a stationary contact 70. The movable contact 66 is movable along the first longitudinal axis 34 between a closed position (illustrated in FIG. 2) and an open position (not shown) to selectively establish or break contact with the stationary contact 70. The first terminal 30 is electrically coupled to the stationary contact 70 and is configured to be electrically coupled to a first power transmission line (not shown).

The source conductor assembly 22 includes a source conductor 74 and a sensor assembly 78, each at least partially molded within the second bushing 54 of the main housing 46. The sensor assembly 78 can include a current transformer, a voltage sensor, or both. One end of the source conductor 74 is electrically coupled to the movable contact 66 via a current interchange 82. The opposite end of the source conductor 74 is electrically coupled to the second terminal 38, which in turn is configured to be electrically coupled to a second power transmission line (not shown).

With continued reference to FIG. 2, the actuator assembly 26 includes a drive shaft 86 extending through the main housing 46 and coupled at one end to the movable contact 66 of the VI assembly 18. In the illustrated embodiment, the drive shaft 86 is coupled to the movable contact 66 via an encapsulated spring 90 to permit limited relative movement between the drive shaft 86 and the movable contact 66. The opposite end of the drive shaft 86 is coupled to an output shaft 94, which in turn is coupled to a plunger 103 of an electromagnetic actuator 98. The electromagnetic actuator 98 is operable to move the plunger 103—and with it, the output shaft 94 and drive shaft 86—along the first longitudinal axis 34 to move the movable contact 66 relative to the stationary contact 70.

The actuator assembly 26 includes a controller (not shown) that controls operation of the electromagnetic actuator 98. In some embodiments, the controller receives feedback from the sensor assembly 78 and energizes a coil 101 of the electromagnetic actuator 98 in response to one or more sensed conditions. The coil 101 may be energized with positive or negative polarity in order to linearly move the plunger 103 within the actuator 98. For example, the controller may receive feedback from the sensor assembly 78 indicating that a fault or trip has occurred. In response, the controller may control the electromagnetic actuator 98 to move the plunger 103, output shaft 94, drive shaft 86, and movable contact 66 downward. The movable contact 66 separates from the fixed contact 70, thereby opening the VI assembly 18 and breaking the circuit between the terminals 30, 38. The controller may also control the electromagnetic actuator 98 to automatically close the VI assembly 18 once the fault has been cleared (e.g., as indicated by the sensor assembly 78) by energizing the electromagnetic actuator 98 to move the plunger 103, output shaft 94, drive shaft 86, and movable contact 66 upward. The movable contact 66 engages the fixed contact 70 and re-establishes the circuit between the terminals 30, 38.

In the illustrated embodiment, the actuator assembly 26 further includes a manual trip assembly 102 that can be used to manually open the VI assembly 18. The manual trip assembly 102 includes a handle 104 accessible from an exterior of the housing assembly 14 (FIG. 1). The handle 104 is rotatable to move a yoke 106 inside the housing assembly 14 (FIG. 2). The yoke 106 is engageable with a collar 110 on the output shaft 94 to move the movable contact 66 toward the open position.

The housing assembly 14 further includes an actuator housing 114 enclosing the electromagnetic actuator 98 and a mounting head 118 coupled between the actuator housing 114 and the main housing 46. In the illustrated embodiment, the mounting head 118 is coupled to the main housing 46 by a first plurality of threaded fasteners 122, and the actuator housing 114 is coupled to the mounting head 118 opposite the main housing 46 by a second plurality of threaded fasteners 126. (FIG. 1).

Figure 3:
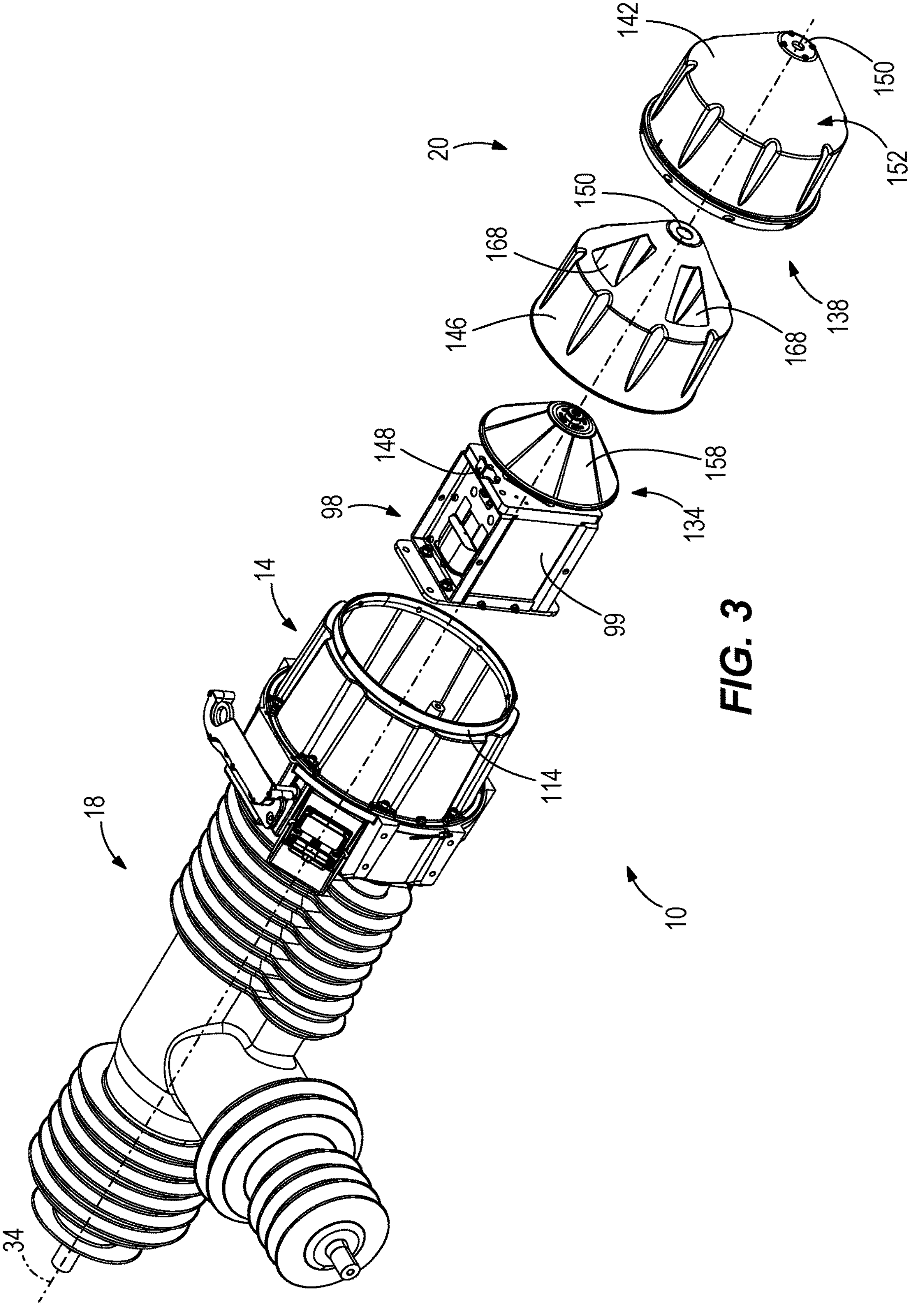
FIG. 3 is a partially exploded perspective view of the recloser of FIG. 1.
Figure 4:
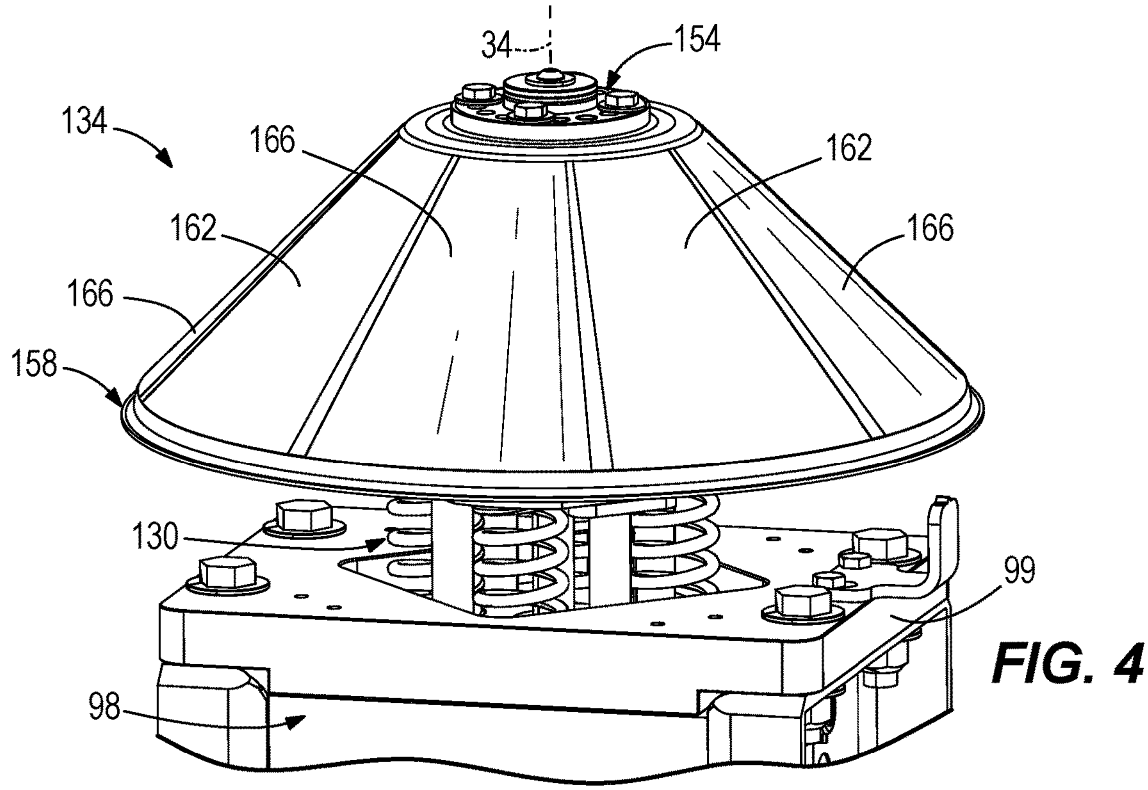
FIG. 4 is a perspective view illustrating an indicator body of the indicator assembly of FIG. 1.
Figure 5:
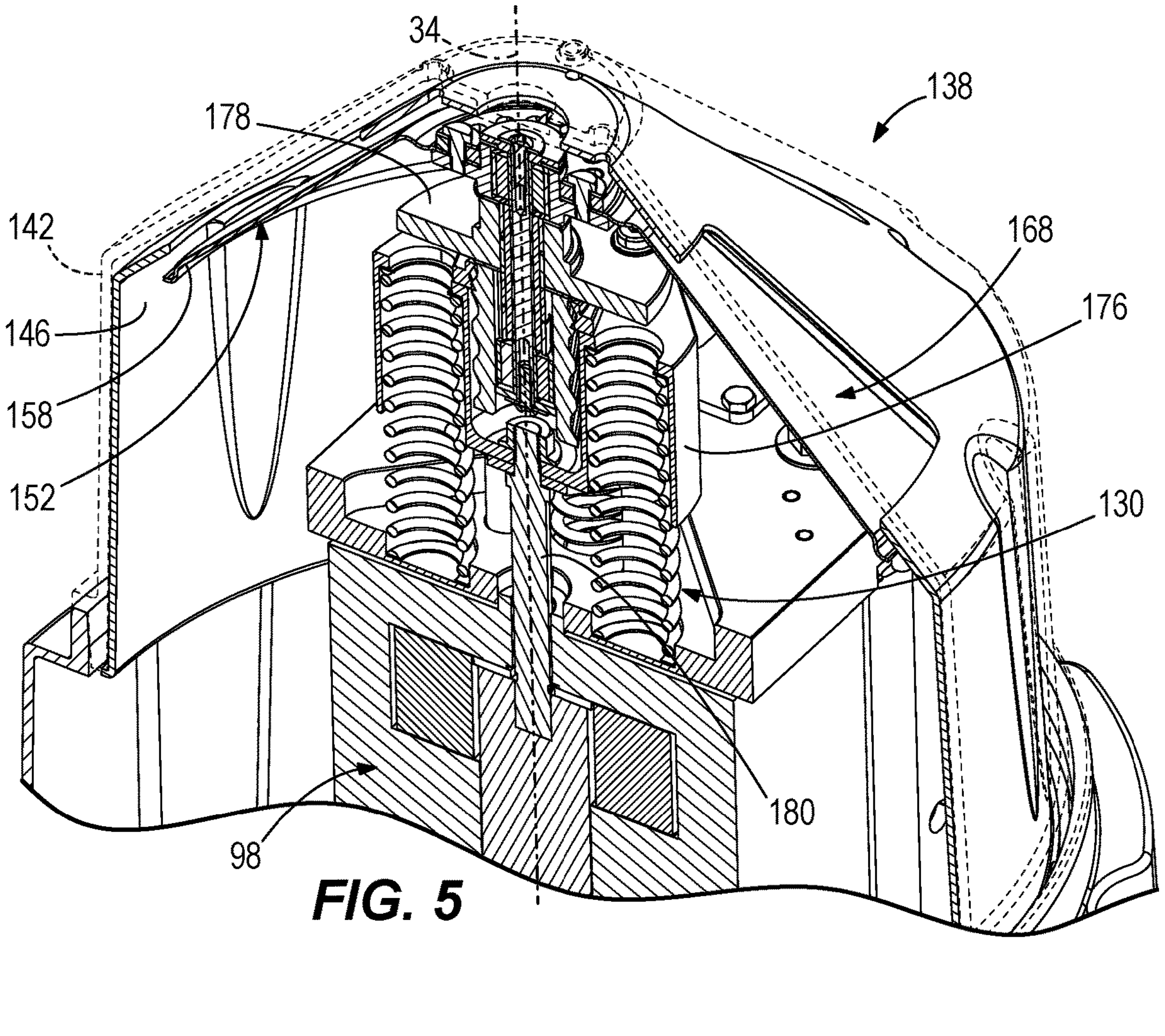
FIG. 5 is a perspective cross-sectional view of the indicator assembly of FIG. 1, illustrating an interface between the indicator assembly and an operating mechanism of the recloser.

Referring now to FIGS. 3-5, the status indicator assembly 20 includes a drive mechanism 130 at least partially supported by a casing 99 of the electromagnetic actuator 98, a display assembly 134, and a cover assembly 138 (FIGS. 3 and 5) at least partially enclosing the display assembly 134. As described in greater detail below, the drive mechanism 130 is operable to rotate the display assembly 134 in response to operation of the electromagnetic actuator 98, to indicate an operational status (i.e. contacts 66, 70 open or contacts 66, 70 closed) of the recloser 10.

In the illustrated embodiment, the indicator assembly 20 is positioned at an end of the housing assembly 14 that is generally opposite the first terminal 30 along the first longitudinal axis 34. As such, the indicator assembly 20 is positioned on a bottom portion of the recloser 10 when the recloser 10 is mounted in an upright position (e.g., FIG. 2), such that the indicator assembly 20 is viewable from below the recloser 10 from various different angles, the significance of which will be expanded on below with reference to FIGS. 10A-10C.

With reference to FIG. 3, the cover assembly 138 includes an outer protective cover or shell 142 and a frame 146 at least partially surrounded by the shell 142. In the illustrated embodiment, the shell 142 is generally transparent or translucent such that the frame 146 is viewable through the shell 142 when covered or surrounded by the shell 142. In the illustrated embodiment, the shell 142 and inner frame 146 are fastened, press-fit, or otherwise coupled to the bottom end of the actuator housing 114. The shell 142 and the inner frame 146 each include a central aperture 150 formed in an end or nose 152 part of the cover assembly 138, opposite the actuator housing 114. The apertures 150 are centrally aligned with the first longitudinal axis 34 and may provide drainage and ventilation to inhibit condensation and clouding of the shell 142.

Figure 3A:
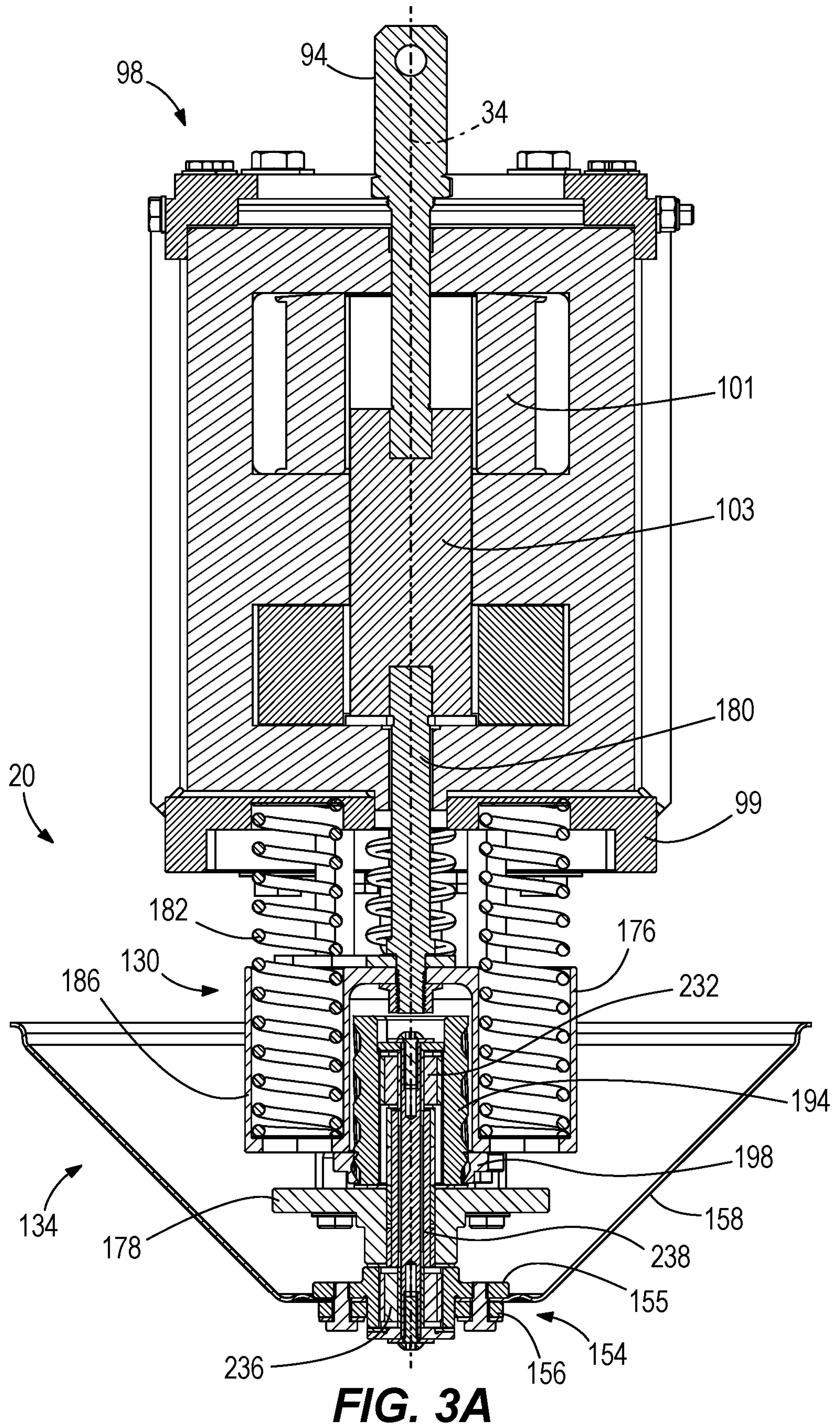
FIG. 3A is a cross-sectional view of the indicator assembly and an electromagnetic actuator of the recloser of FIG. 1.

Referring to FIGS. 3A-4, the display assembly 134 includes an indicator body 158 having a plurality of first sections 162 and a plurality of second sections 166 (FIG. 4) equally spaced on the indicator body 158 about the first longitudinal axis 34. A clamping assembly 154 attaches the indicator body 158 to the drive mechanism 130 (FIG. 3A). In the illustrated embodiment, the clamping assembly 154 includes a clamping body 155 and a clamping plate 156 coupled to the clamping body 155 (e.g., by one or more fasteners). The indicator body 158 is sandwiched between the clamping body 155 and the clamping plate 156 to couple the indicator body 158 for co-rotation with the clamping assembly 154.

Referring to FIG. 4, the indicator body 158 has a frustoconical shape in the illustrated embodiment, such that the first and second sections 162, 166 on the indicator body 158 are angled relative the first longitudinal axis 34. In other embodiments, the indicatory body 158 may be hemispherical, disc shaped, or the like. The first and second sections 162, 166 alternate in a circumferential direction of the indicator body 158 and contrast with one another to make the different sections 162, 166 identifiable. For example, the first plurality of sections 162 includes a first color (e.g., red, pink, amber, etc.) and the second plurality of sections 166 includes a second color (e.g., green, blue, etc.) contrasting with the first color. The sections 162, 166 may additionally or alternatively include contrasting indicia or markings, such as the word "open" or the word "closed." In the illustrated embodiment, "closed" corresponds to the first color (e.g., red) while "open" corresponds to the second color (e.g., green). In some embodiments, the colored portions of the first and second sections 162, 166 and/or the indicia are adhered to the indicator body 158. In other embodiments, the indicator body 158 itself may be painted or formed from colored materials to form the sections 162, 166.

With reference to FIGS. 3 and 5, the frame 146 and shell 142 each generally define a shape complimentary to the shape of the indicator body 158 such that the indicator body 158 fits within the cover assembly 138. Stated another way, the angle relative to the first longitudinal axis 34 at which the first and second plurality of sections 162, 166 on the indicator body 158 are supported in the display assembly 134 is substantially similar to the angle of the nose portion 152 of the cover assembly 138 relative to the first longitudinal axis 34.

The first and second pluralities of sections 162, 166 are alternately viewable through windows 168 (FIG. 3) formed in the frame 146. As stated above, the shell 142 is generally transparent, such that the sections 162, 166 are viewable through the shell 142 and the windows 168. As further illustrated in FIGS. 3 and 5, the illustrated frame 146 includes four windows 168 equally circumferentially spaced about the frame 146, and each of the first and second pluralities of sections 162, 166 includes four similarly colored sections (e.g., four red sections and four green sections) that are selectively alignable with the four windows 168. In general, the indicator body 158 is rotated within the cover assembly 138 by the drive mechanism 130 to align either the first plurality of sections 162 or the second plurality of sections 166 with the windows 168 to indicate the operational status of the recloser 10. In other embodiments, the indicator body 158 and frame 146 may include any other desired number of sections 162, 166 and corresponding number of windows 168.

Referring now to FIG. 3A, the drive mechanism 130 of the indicator assembly 20 is coupled to the plunger 103 of the electromagnetic actuator 98 to receive a force generated through the electromagnetic actuator 98 (e.g., in response to energizing the coil 101 of the electromagnetic actuator 98). A plurality of guide pins 172 (FIGS. 8B and 8C) extends from the electromagnetic actuator 98 and is received by a corresponding plurality of guide bores 174 formed in a carrier member 176 of the drive mechanism 130. The pins 172 slidably engage the bores 174, such as through linear bearings or slide bushings (not shown) supported within the bores 174, to accommodate movement of the carrier 176 along the first longitudinal axis 34 relative the electromagnetic actuator 98. The pins 172 also engage the bores 174 to inhibit relative rotational movement (e.g., about the first longitudinal axis 34) between the carrier 176 and the electromagnetic actuator 98.

Figure 6:
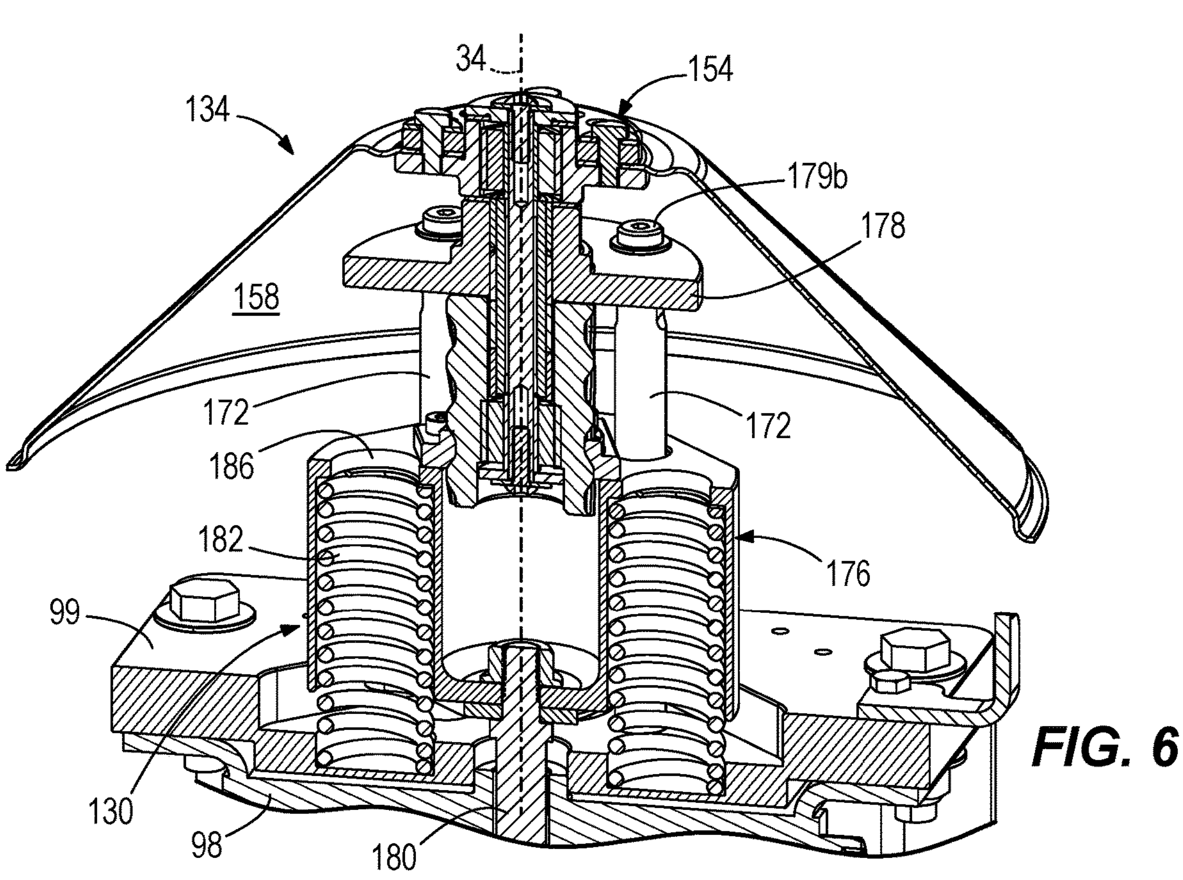
FIG. 6 is a perspective cross-sectional view of the indicator assembly of FIG. 1 in a closed state of the recloser.
Figure 7:
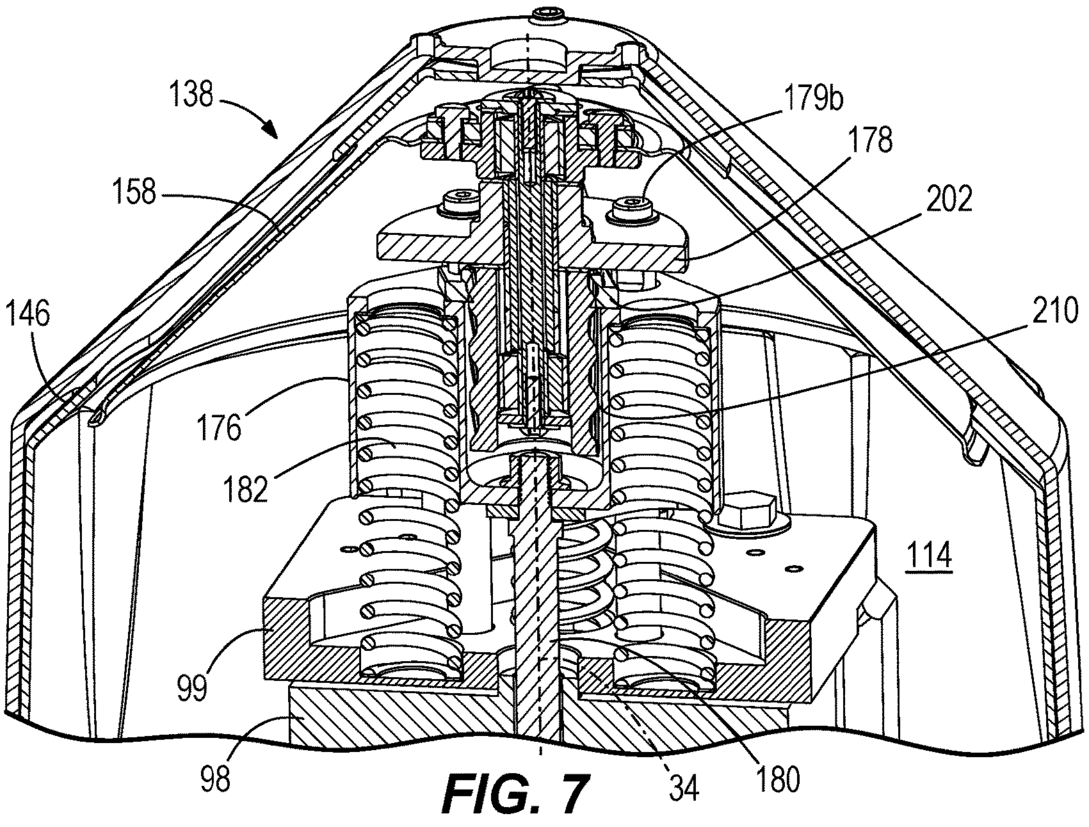
FIG. 7 is a perspective cross-sectional view of the indicator assembly of FIG. 1 in an open state of the recloser.
Figure 8B:
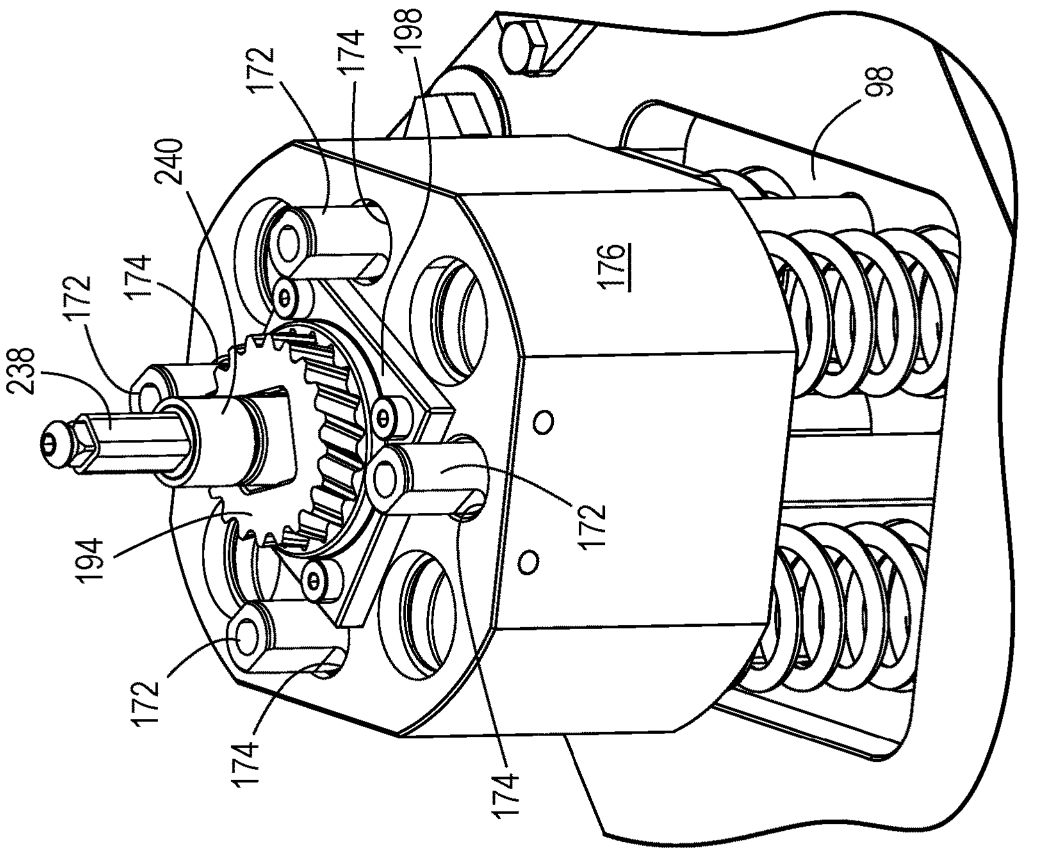
FIG. 8B is an isolated perspective view of a portion of the drive mechanism of FIG. 8A.
Figure 8A:
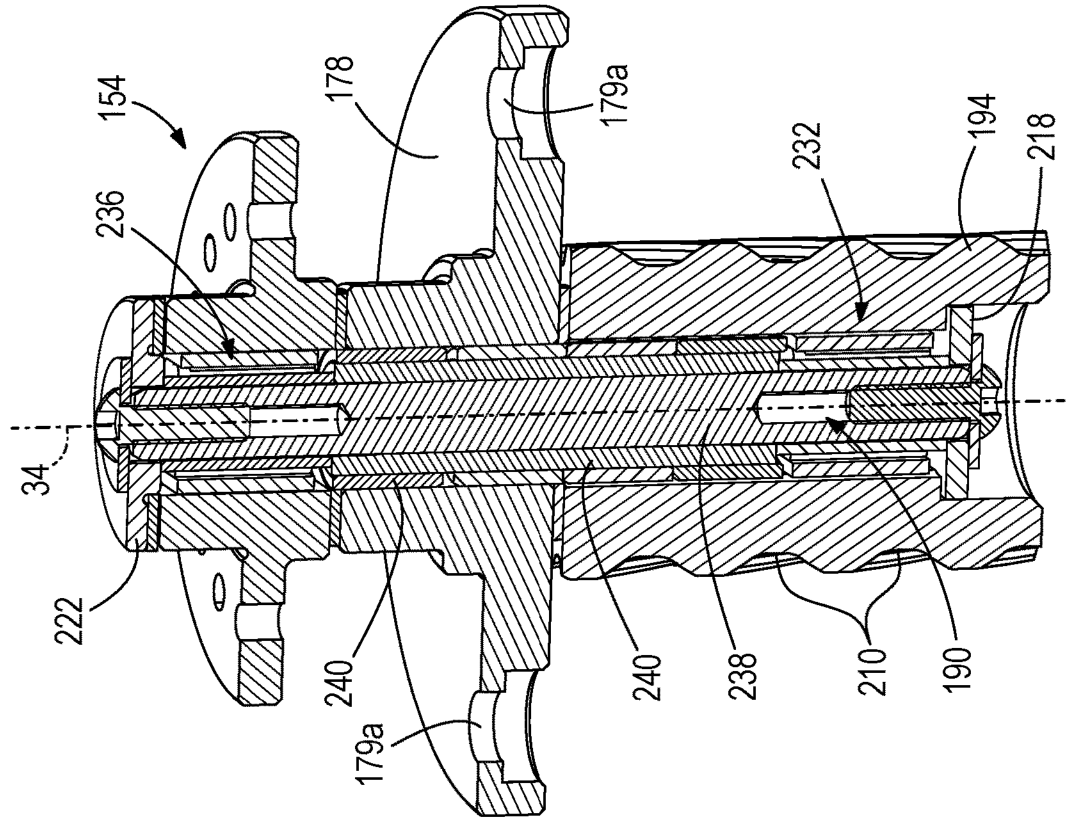
FIG. 8A is a perspective cross-sectional view of a drive mechanism of the indicator assembly of FIG. 1.
Figure 8C:
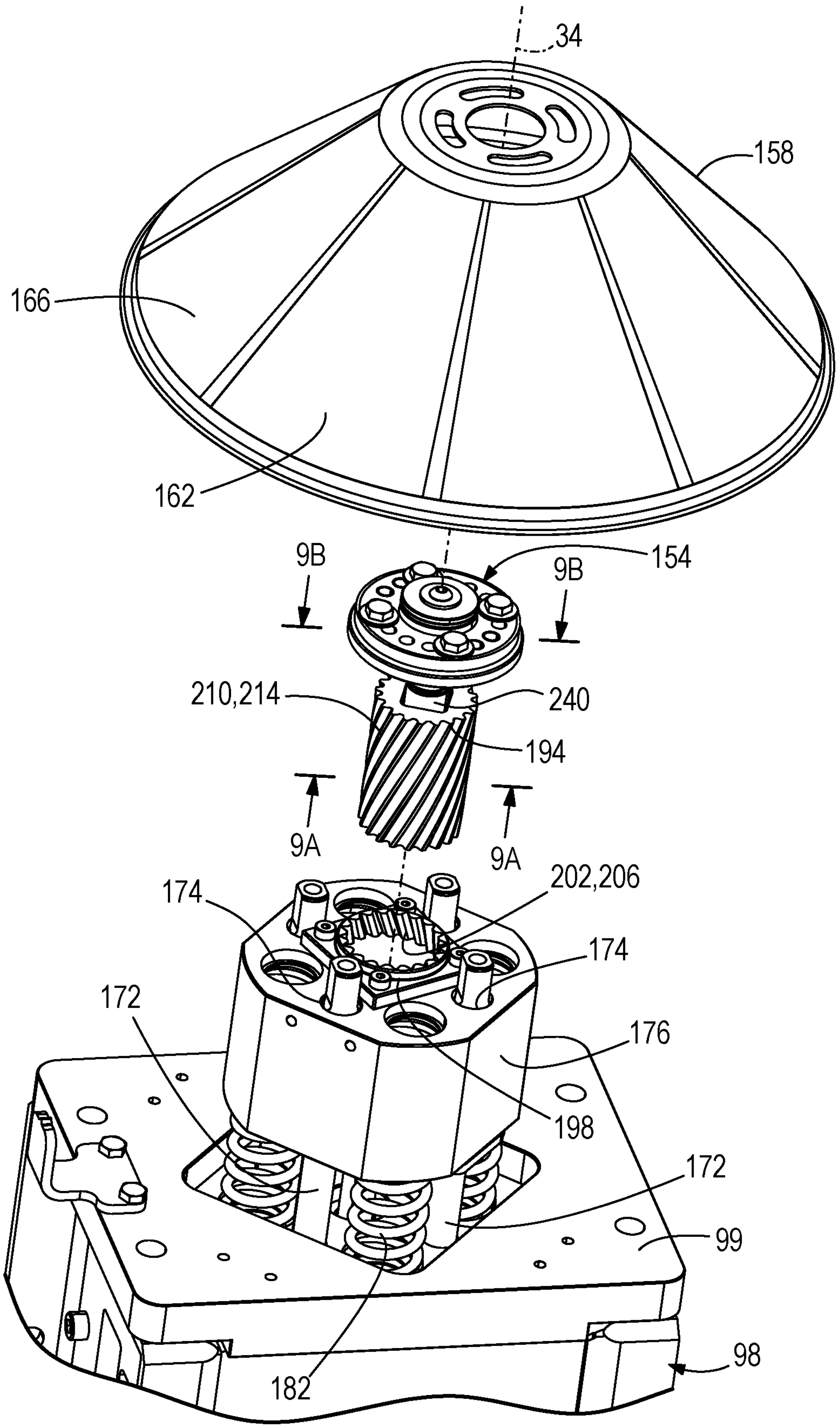
FIG. 8C is an exploded perspective view of the drive mechanism of FIG. 8A.

With reference to FIGS. 6 and 8C, the pins 172 each extend from the casing 99 of the electromagnetic actuator 98 and support the entirety of the display assembly 134 and the drive assembly 130 from the casing 99. As such, the cover assembly 138 does not support or otherwise bear any of the weight or internal forces produced by the drive assembly 130 or display assembly 134. As illustrated in FIG. 7, the indicator body 158 is spaced from inner frame 146 of the cover assembly 138 to define a gap therebetween.

The pins 172 extend through the carrier 176, and couple to a flange or platform 178. In this manner, the platform 178 is supported by/mounted on the pins 172 and thereby fixed to the casing 99 of the electromagnetic actuator 98. The carrier 176 is slidably moveable along the pins 172 relative to and between the platform 178 and the casing 99. In the illustrated embodiment, the platform 178 includes seats 179*a* (FIG. 8A) that receive fasteners 179*b* (FIG. 6) therein to attach the pins 172 to the platform 178; however, the platform 178 may be attached to the pins 172 in other ways.

Referring to FIGS. 3A, 6, and 7, a drive shaft 180 is fixed to the plunger 103 of the electromagnetic actuator 98 and moves with the plunger 103 along the first longitudinal axis 34 in response to operation of the electromagnetic actuator 98. The drive shaft 180 provides a linear input to the drive mechanism 130, to move the carrier 176 along the first longitudinal axis 34 between a first or closed position of the indicator assembly 20 (FIG. 6), in which the carrier 176 is positioned adjacent the casing 99, and a second or open position of the indicator assembly 20 (FIG. 7), in which the carrier 176 is adjacent the platform 178. The open position of the indicator assembly 20 corresponds with the open position of the contacts 66, 70, and the closed position of the indicator assembly 20 corresponds with the closed position of the contacts 66, 70 (FIG. 2). The drive mechanism 130 converts the linear movement of the drive shaft 180 into rotational movement of the indicator body 158.

For example, in the illustrated embodiment, movement of the drive shaft 180 towards the electromagnetic actuator 98 causes the indicator body 158 to rotate about the first longitudinal axis 34 to align the first plurality of sections 162 (red) with the viewing windows 168 to thereby indicate a closed status of the circuit/recloser 10. Movement of the drive shaft 180 away from the electromagnetic actuator 98 causes the indicator body 158 to rotate about the first longitudinal axis 34 to align the second plurality of sections 162 (green) with the viewing windows 168 to thereby indicate an open status of the circuit/recloser 10. Stated another way, an operator or viewer is able to determine from the indicator assembly 20 whether the recloser 10 is in an energized/closed operating state or a de-energized/open operating state.

Referring to FIG. 3A, the carrier 176 accommodates a plurality of coil springs 182 in respective bores 186 extending longitudinally within the carrier 176. The springs 182 extend between the carrier 176 and an end of the casing 99 to bias the carrier 176 away from the electromagnetic actuator 98 (i.e. toward the open position). Thus, the springs 182 also act to bias the drive shaft 180, and with it, the plunger 103, output shaft 94, drive shaft 86, and movable contact 66 (FIG. 2), toward the open position. In this way, the springs 182 may assist the electromagnetic actuator 98 in opening the contacts 66, 70.

Referring to FIGS. 8A-8C, the drive mechanism 130 further includes a driven gear 194 and a drive gear 198. The drive gear 198, best illustrated in FIG. 8C, is fastened to the carrier 176 for movement therewith along the first longitudinal axis 34. The drive gear 198 is attached to the carrier 176 so as to inhibit relative rotation between the carrier 176 and the drive gear 198. In some embodiments, the drive gear 198 may be integrally formed with the carrier 176.

The illustrated drive gear 198 includes a plurality of helical splines or grooves 202 that extend about the first longitudinal axis 34. The helical splines 202 on the drive gear 198 define an interior 206 of the drive gear 198. The helical splines 202 of the drive gear 198 slidably engage a corresponding plurality of helical splines 210 formed on the driven gear 194. Similar to the drive gear 198, the helical splines 210 of the driven gear 194 extend helically about the first longitudinal axis 34. The helical splines 210 on the driven gear 194 define an exterior 214 of the driven gear 194.

As best illustrated in FIG. 8A, the drive mechanism 130 further includes an output shaft assembly 190 extending along the longitudinal axis 34. The output shaft assembly 190 includes a first thrust bearing or washer 218, a second thrust bearing or washer 222, a first or input dampener 232, and a second or output dampener 236. The driven gear 194 is held axially along the first longitudinal axis 34 between the first thrust bearing 218 and the second thrust bearing 222. When the carrier 176 is moved linearly along the first longitudinal axis 34, the drive gear 198 moves axially along the driven gear 194. As such, the helical splines 202 of the drive gear 198 engage the helical splines 210 of the driven gear 194 to impart a rotational movement to the driven gear 194, which in turn rotates the output drive shaft 238, the clamp assembly 154, and the indicator body 158, as discussed below.

Figure 9A:
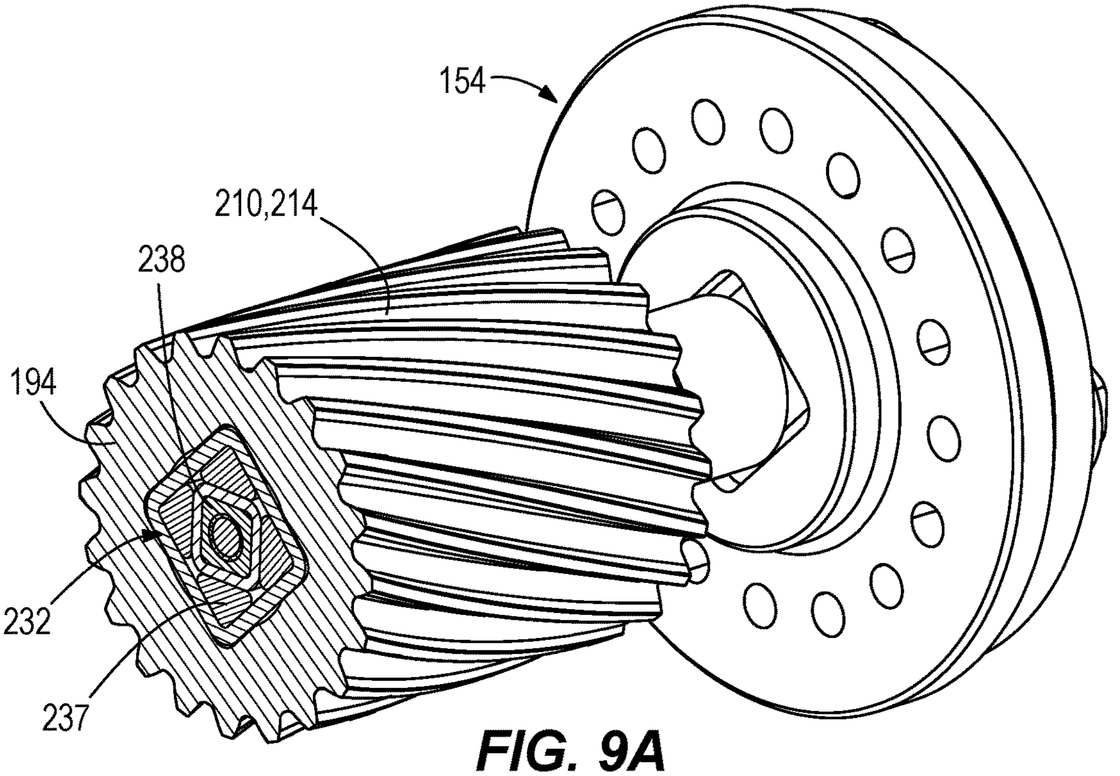
FIG. 9A is a cross-sectional view taken along line 9A-0A in FIG. 8C.
Figure 9B:
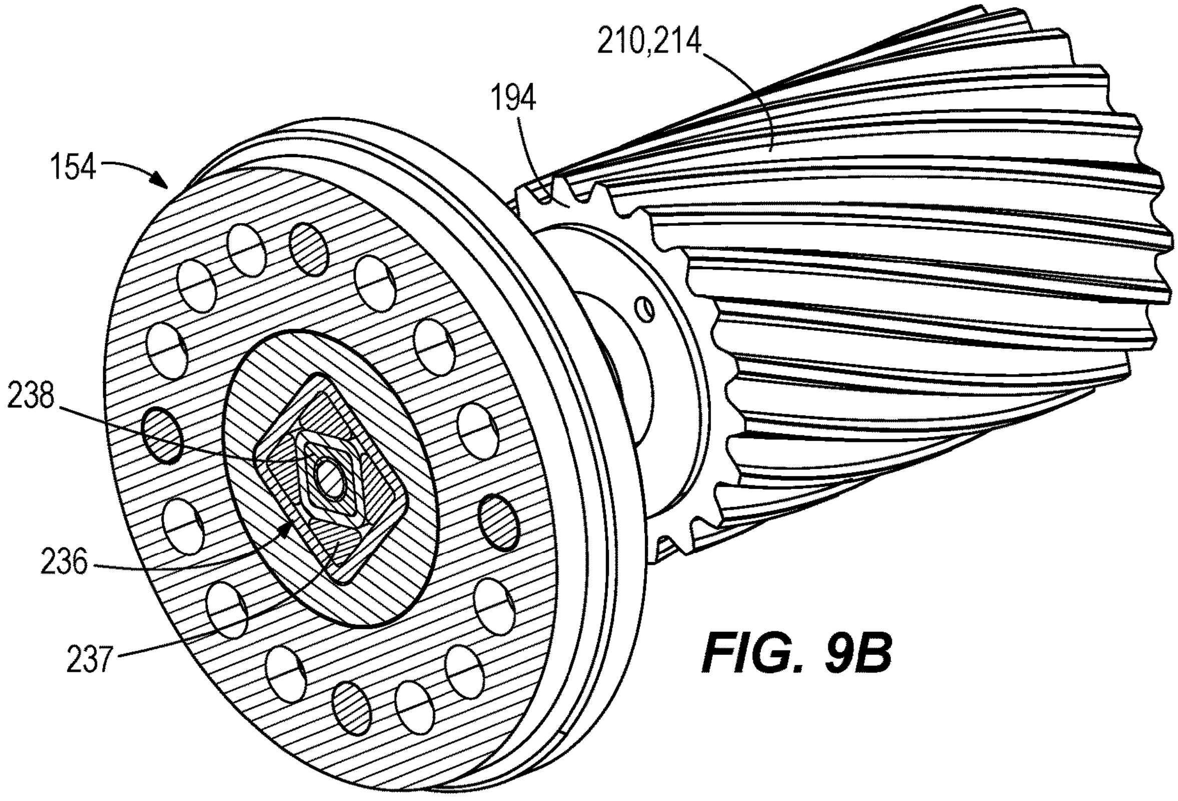
FIG. 9B is a cross-sectional view taken along line 9B-9B in FIG. 8C.

Referring to FIGS. 9A-B, the illustrated output drive shaft 238 has a square cross-sectional shape, but may have other shapes, such as other polygonal or non-circular cross-sectional shapes in other embodiments. The input dampener 232 is supported within the driven gear 194 and surrounds the output drive shaft 238 (FIG. 9A). The output dampener 236 is supported within the clamping assembly 154 and surrounds the output drive shaft 238 (FIG. 9B). Each of the dampeners 232, 236 includes a plurality of dampening elements 237 abutting the flat sides of the output drive shaft 238. The dampening elements 237 may be made of an elastomeric material, foam material, or any other compressible material suitable for dampening torque transmission from the driven gear 194 to the output drive shaft 238 and from the output drive shaft 238 to the clamp assembly 154. The output shaft assembly 190 may further include one or more bushings or spacers 240 to further support the output drive shaft 238.

The input dampener 232 and the output dampener 236 are arranged in series. As such, the dampening effects of the input dampener 232 and the output dampener 236 are added increase the amount of dampening from the driven gear 194 to the indicator body 158. For example, in the illustrated embodiment, the input dampener 232 is compressible to permit up to 30 degrees of relative rotation between the driven gear 194 and the output drive shaft 238, and the output dampener 236 is compressible to permit up to 30 degrees of relative rotation between the output drive shaft 238 and the clamp assembly 154 (and thus, the indicator body 158). As such, the input dampener 232 and the output dampener 236 collectively permit up to 60 degrees of relative rotation between the driven gear 194 and the indicator body 158. In other embodiments, the respective dampeners 232, 236 may each permit between 15 degrees and 45 degrees of relative rotation, for a total between 30 degrees and 90 degrees.

Axial movement of the drive gear 198, which is converted to rotation of the driven gear 194 by the engagement of the splines 210, 202 as described above, rotates the output drive shaft 238, which in turn rotates the indicator body 158 of the display assembly 134 about the first longitudinal axis 34. The dampeners 232, 236, allow for limited relative rotation of the driven gear 194 and the clamp assembly 154 relative to the output drive shaft 238, while additionally dampening the forces generated by the electromagnetic actuator 98 and terminating in the display assembly 134. In some scenarios, the forces generated by the electromagnetic actuator 98 may be very high, and the dampening effect reduces wear on the drive mechanism 130 and the display assembly 134.

Figure 10A:
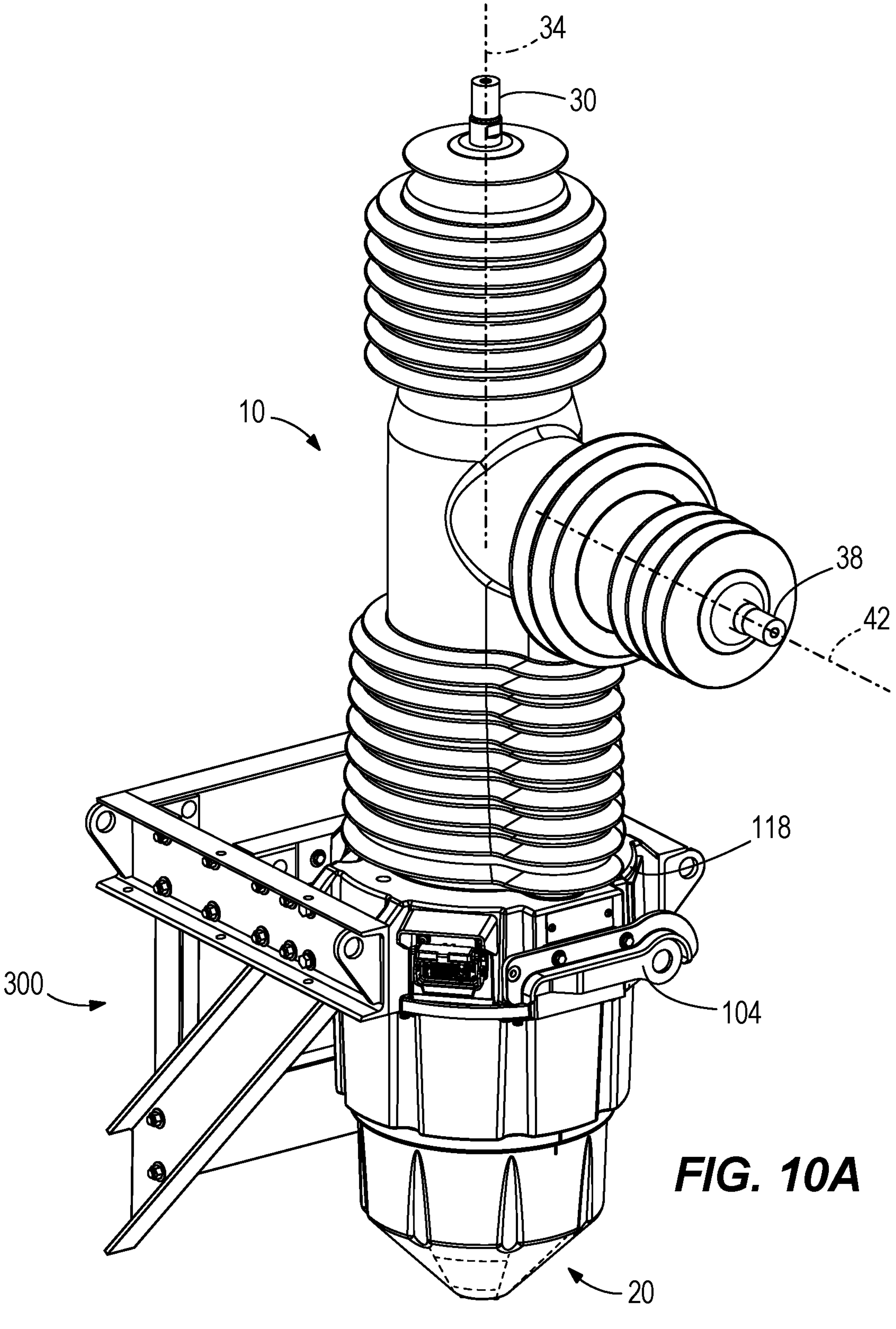
FIG. 10A is a perspective view the switchgear assembly of FIG. 1 coupled to a bracket in a vertical orientation.
Figure 10B:
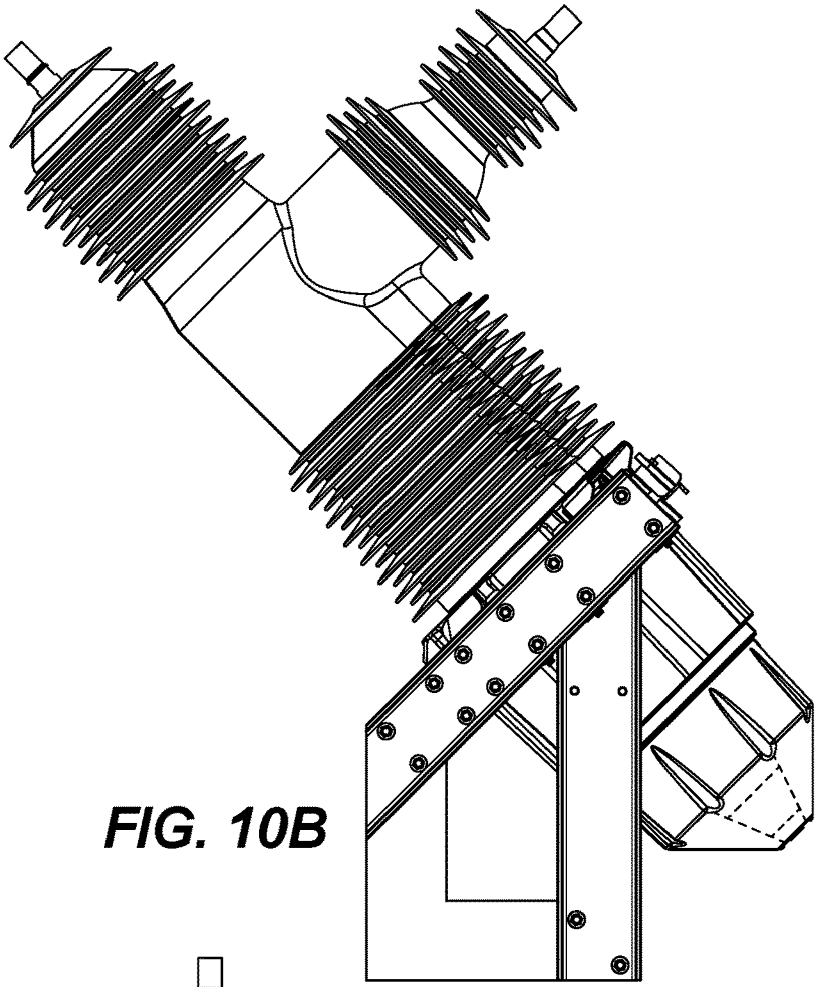
FIG. 10B is a perspective view the switchgear assembly of FIG. 1 coupled to a bracket in an angled orientation.
Figure 10C:
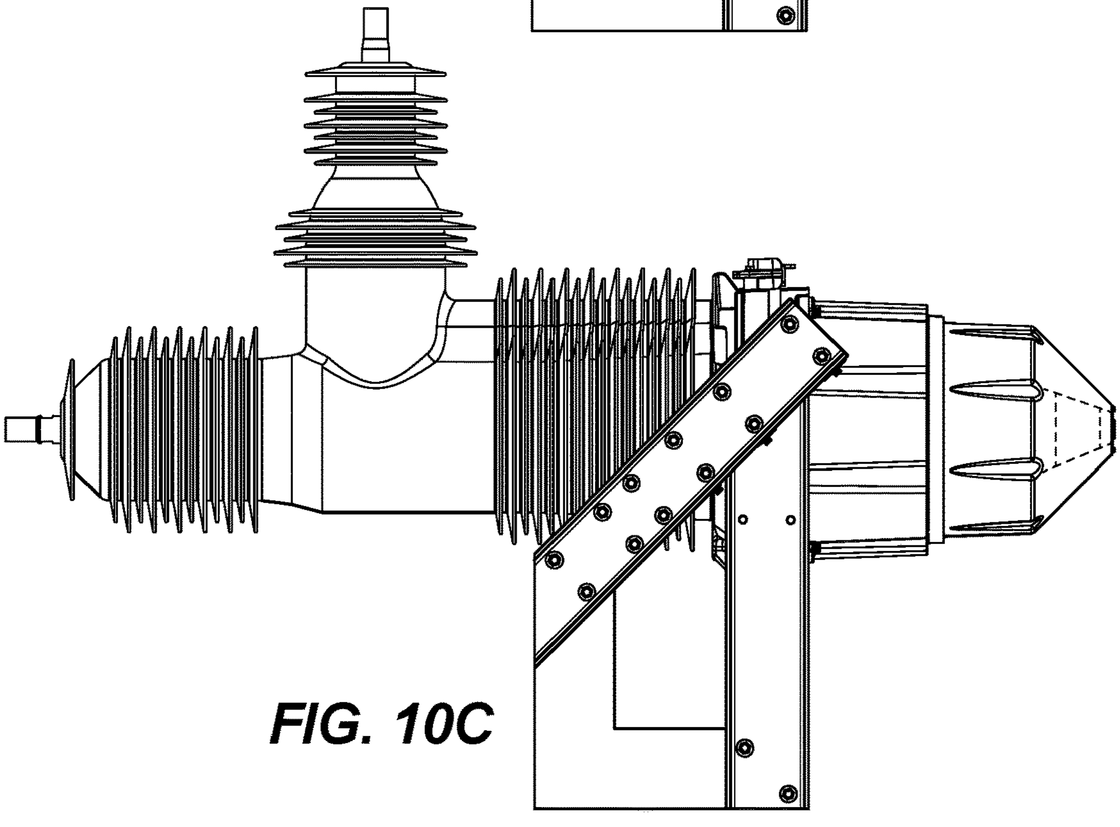
FIG. 10C is a perspective view the switchgear assembly of FIG. 1 coupled to a bracket in a horizontal orientation.

With reference to FIG. 10A-10C, the illustrated recloser 10 is provided with a mounting bracket 300 that interfaces with the mounting head 118 to facilitate mounting the recloser 10 in a variety of different orientations. As illustrated in FIGS. 10B and 10C, the orientation of the mounting bracket 300 may also be varied to change the orientation of the longitudinal axes 34, 42 of the recloser 10 (e.g., from vertical to horizontal) to facilitate the indicator assembly 20 being visible in such various orientations, as well as for other reasons not specifically described (e.g., desired application, wiring requirements, etc.).

Figure 11:
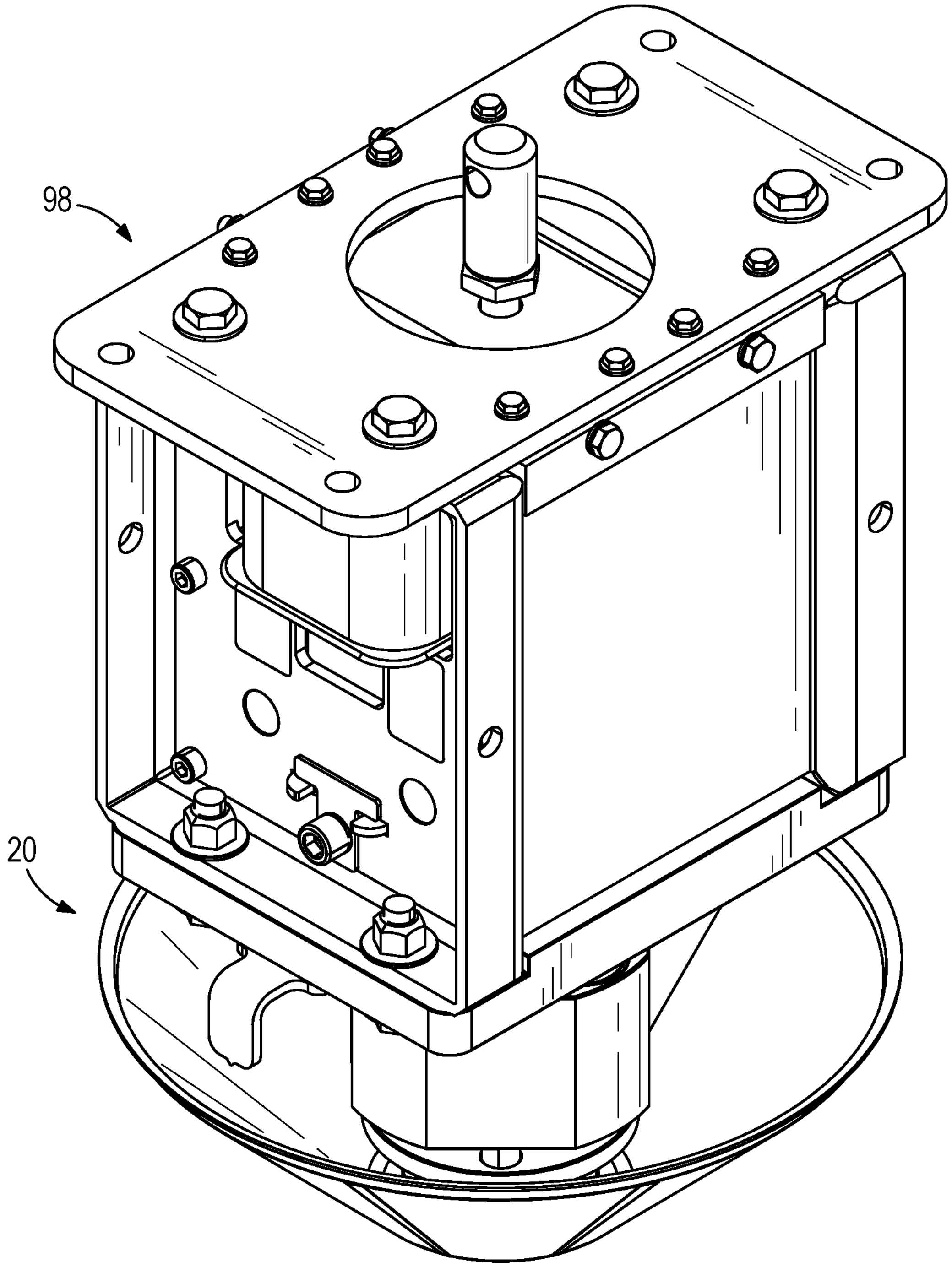
FIG. 11 is a perspective view illustrating the indicator assembly and the electromagnetic actuator of the recloser of FIG. 1.
Figure 12:
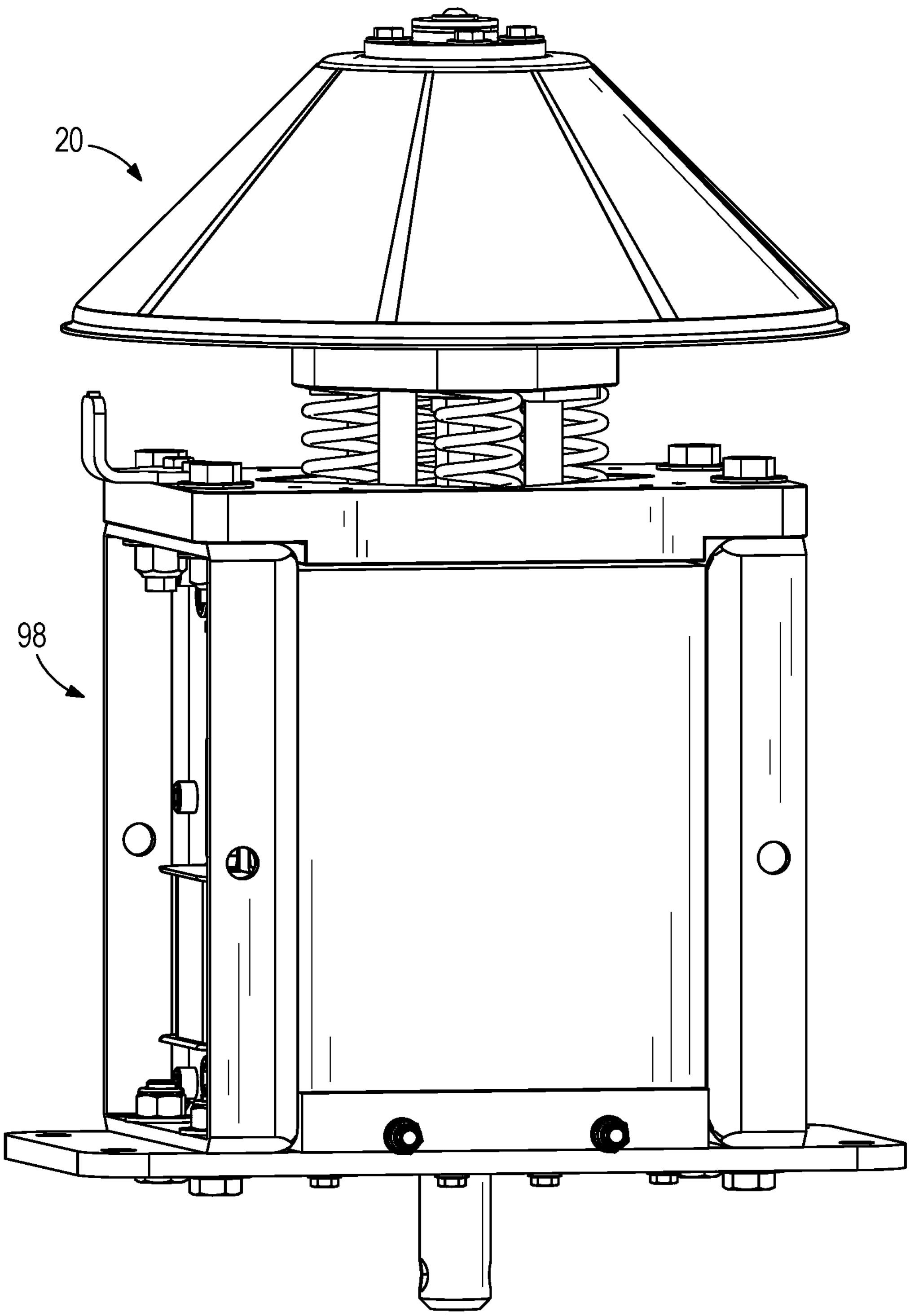
FIG. 12 is another perspective view illustrating the indicator assembly and the electromagnetic actuator of the recloser of FIG. 1.

Thus, the present disclosure sets forth, among other things, a high voltage recloser 10 suitable for use in power transmission applications up to 72.5 kV. The recloser 10 includes an indicator assembly 20 that is visible in various mounting orientations of the recloser 10 to indicate an operational status of the recloser. In addition, the indicator assembly 20 is able to withstand large actuation forces generated by the electromagnetic actuator 98 and springs 182 of the recloser 10 by including dampeners 232, 238 within the indicator drive mechanism 130. FIGS. 11 and 12 provide additional illustration of the indicator assembly 20 and electromagnetic actuator 98.

Various features and advantages of the disclosure are set forth in the following claims.

What is claimed is:

1. An indicator operable to display whether a switchgear assembly is in an open position or a closed position, the indicator comprising:

an indicator body rotatable relative to a longitudinal axis of the switchgear assembly, wherein upon rotation the indicator is configured to selectively display indicia that indicates whether the switchgear assembly is in the open position or the closed position;

a drive member coupled to a movable contact of the switchgear assembly such that operation of the switchgear assembly between the open position and the closed position moves the drive member along the longitudinal axis;

a driven member engaged with the drive member such that movement of the drive member rotates the driven member about the longitudinal axis, wherein the driven member is coupled to the indicator body such that rotation of the driven member rotates the indicator body; and a cover coupled to a housing for the switchgear assembly and through which at least a portion of the indicator body is visible, and wherein the driven member and indicator body are coupled to the switchgear assembly independently from the cover.

2. The indicator of claim 1, wherein the switchgear assembly includes an actuator operable to move the movable contact between the open position and the closed position, and wherein the drive member and indicator body are supported by a casing for the actuator.

3. The indicator of claim 2, further comprising a movable carrier configured to support the drive member and coupled to the movable contact, and a plurality of pins that extends from the actuator casing, wherein the plurality of pins extends through opposite ends of the movable carrier such that the movable carrier is configured to translate relative to the actuator casing along the plurality of pins in response to movement of the movable contact between the open position and the closed position.

4. The indicator of claim 1, wherein the indicator includes a dampener coupled between the driven member and the indicator body to permit limited relative rotation between the driven member and the indicator body.

5. The indicator of claim 4, wherein the dampener is a first dampener and further comprising a second dampener spaced from the first dampener along the longitudinal axis.

6. The indicator of claim 1, further comprising an actuator operable to move the switchgear assembly between an open position and a closed position, and wherein the driven member and indicator are supported on a platform coupled to the actuator independently from the cover.

7. The indicator of claim 6, further comprising a plurality of pins extending between the actuator and the platform, wherein the platform is supported by the plurality of pins.

8. The indicator of claim 6, wherein operation of the switchgear assembly from the closed position to the open position moves the drive member in a direction towards the platform.

9. The indicator of claim 6, wherein the drive member is biased in a direction towards the platform by a spring that extends between the actuator and the drive member.

10. The indicator of claim 1, wherein the driven member is configured to receive projections provided on an outer surface of the drive member to engage with the drive member such that movement of the drive member along the longitudinal axis rotates the driven member about the longitudinal axis.

11. The indicator of claim 10, wherein the projections on the outer surface of the drive member are configured as a first helical spline and the driven member includes a second helical spline configured to engage the first helical spline.

12. An indicator operable to display whether a switchgear assembly is in an open position or a closed position, the indicator comprising:

an indicator body rotatable to selectively display indicia that indicates whether the switchgear assembly is in the open position or the closed position;

a drive member coupled to a movable contact of the switchgear assembly such that operation of the switchgear assembly between the open position and the closed position moves the drive member along a longitudinal axis of the switchgear assembly; and a driven member configured to engage the drive member such that movement of the drive member along the longitudinal axis rotates the driven member, wherein an inner surface of the drive member encircles and engages a periphery of the driven member, and wherein the driven member is coupled to the indicator body such that rotation of the driven member rotates the indicator body.

13. The indicator of claim 12, further comprising a cover coupled to a housing for the switchgear assembly and through which at least a portion of the indicator body is visible, and wherein the driven member and indicator body are supported by the switchgear assembly independently of the cover.

14. The indicator of claim 13, further comprising:

a movable carrier configured to support the drive member, wherein a plurality of pins extends along the longitudinal axis from an actuator assembly casing through opposite ends of the movable carrier such that the movable carrier is configured to translate relative to the actuator assembly casing along the plurality of pins in response to movement of the movable contact between the open position and the closed position; and a platform fixed to the pins opposite the actuator assembly casing and configured to support the driven member and indicator, wherein the drive member, driven member, and indicator are all supported by the actuator assembly casing independently from the cover.

15. The indicator of claim 12, wherein the drive member is supported by a movable carrier coupled to the switchgear assembly, and further comprising a plurality of pins that extends from the switchgear assembly and is configured to support the movable carrier for sliding movement on the plurality of pins.

16. An indicator operable to display whether a switchgear assembly is in an open position or a closed position, the indicator comprising:

an indicator body rotatable to selectively display indicia that indicates whether the switchgear assembly is in the open position or the closed position;

a drive member coupled to a movable contact of the switchgear assembly such that operation of the switchgear assembly between the open position and the closed position moves the drive member along a longitudinal axis of the switchgear assembly;

a driven member that is configured to engage the drive member such that movement of the drive member along the longitudinal axis rotates the driven member, and wherein the driven member is coupled to the indicator body such that rotation of the driven member rotates the indicator body, wherein the driven member is configured to receive projections provided on an outer surface of the drive member to engage the drive member such that movement of the drive member along the longitudinal axis rotates the driven member about the longitudinal axis, and wherein the driven member is coupled to the indicator body such that rotation of the driven member rotates the indicator body.

17. The indicator of claim 16, further comprising a dampener coupled between the driven member and the indicator body to permit limited relative rotation between the driven member and the indicator body.

18. The indicator of claim 16, further comprising:

a cover coupled to a housing for the switchgear assembly and through which at least a portion of the indicator body is visible;

a movable carrier configured to support the drive member, wherein a plurality of pins extends along the longitudinal axis from an actuator assembly casing through opposite ends of the movable carrier such that the movable carrier is configured to translate relative to the actuator assembly casing along the plurality of pins in response to movement of the movable contact between the open position and the closed position; and a platform fixed to the pins opposite the actuator assembly casing and configured to support the driven member and indicator, wherein the driven member and indicator are supported by the actuator assembly casing independently from the cover.

19. The indicator of claim 16, wherein the projections on the outer surface of the drive member are configured as a first helical spline and the driven member includes a second helical spline configured to engage the first helical spline.

20. The indicator of claim 16, further comprising a cover coupled to a housing for the switchgear assembly and through which at least a portion of the indicator body is visible, wherein the driven member and indicator body are coupled to the switchgear assembly independently from the cover.

* * * * *